(12) United States Patent
Beevers

(10) Patent No.: US 11,117,268 B2
(45) Date of Patent: Sep. 14, 2021

(54) ROBOT APPENDAGE

(71) Applicant: Timothy R. Beevers, McMinnville, OR (US)

(72) Inventor: Timothy R. Beevers, McMinnville, OR (US)

(*) Notice: Subject to any disclaimer, the term of this patent is extended or adjusted under 35 U.S.C. 154(b) by 141 days.

(21) Appl. No.: 16/452,908

(22) Filed: Jun. 26, 2019

(65) Prior Publication Data

US 2020/0406474 A1    Dec. 31, 2020

(51) Int. Cl.
*B25J 15/10* (2006.01)
*B25J 15/00* (2006.01)
*B25J 15/08* (2006.01)

(52) U.S. Cl.
CPC ......... *B25J 15/0009* (2013.01); *B25J 15/086* (2013.01); *B25J 15/10* (2013.01); *B25J 15/0028* (2013.01)

(58) Field of Classification Search
CPC .... B25J 15/0009; B25J 15/0028; B25J 15/10; B25J 15/103; B25J 15/086; B25J 15/0233; B25J 9/104; B25J 17/0275; A61F 2/586; A61F 2002/587
See application file for complete search history.

(56) References Cited

U.S. PATENT DOCUMENTS

| | | |
|---|---|---|
| 4,740,126 A | 4/1988 | Richter |
| 4,834,761 A | 5/1989 | Walters |
| 5,297,443 A | 3/1994 | Wentz |
| 5,318,331 A * | 6/1994 | Tozuka ............... B25J 15/0206 294/106 |
| 5,599,151 A | 2/1997 | Daum et al. |
| 5,845,540 A | 12/1998 | Rosheim |
| 6,247,738 B1 * | 6/2001 | Winkel ............... B25J 15/0009 294/111 |
| 7,296,835 B2 | 11/2007 | Blackwell et al. |
| 8,056,423 B2 | 11/2011 | Abdallah et al. |
| 9,744,677 B2 | 8/2017 | Ohm et al. |
| 2005/0121929 A1 * | 6/2005 | Greenhill ............... B25J 9/1075 294/106 |
| 2011/0001024 A1 * | 1/2011 | Cho ..................... B25J 17/0275 248/205.9 |
| 2015/0047451 A1 * | 2/2015 | Kwon .................... A61B 17/29 74/490.05 |
| 2016/0361814 A1 * | 12/2016 | Beevers .................. B25J 15/10 |

* cited by examiner

*Primary Examiner* — Dean J Kramer
(74) *Attorney, Agent, or Firm* — Timothy E. Siegel Patent Law, PLLC; Timothy E. Siegel

(57) ABSTRACT

A robot hand including a set of carpal bones, each of the carpal bones having at least one adjacent bone; and each carpal bone defining at least one socket. For each pair of adjacent carpal bones, at least one connector having a first and second end and wherein the first end and the second end are each in the form of a ball, and wherein the balls are joined by a connective element. Wherein the ball at the first end of the connector is fitted conformally into the socket of a first one of the pair of adjacent carpal bones and the ball at the second end of the connector is fitted conformally into the socket of a second one of the pair of adjacent bones, thereby joining the carpal bones together, but permitting limited relative movement.

20 Claims, 7 Drawing Sheets

ROBOT APPENDAGE

BACKGROUND OF THE INVENTION

Robotics is gradually shifting from the design of robots that move very quickly through a carefully defined set of motions to robots that have a higher intelligence and a greater range of operation. As robotics advances, various barriers to further progress may emerge. Among the problems encountered in robot design is the use of complex mechanisms to transfer force from a motor to an arm or finger that needs to be moved. These complex mechanisms may include discrete fasteners and multiple hinge components, that are challenging to align and secure. This adds to the expense and defect rate of the manufacturing process.

Few mechanisms in nature rival the complexity of either the human hand or the human foot. The fine movement of the fingers and the wrist is made possible by a complex system of joints, muscles and tendons. The same is true for the ankle and the toes. Mimicking either of these natural systems to create a robot hand or robot foot is no simple matter.

SUMMARY OF INVENTION

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a robot hand including a digit having a distal end that is free and a proximal end, attached to a further structural element. The digit has a first phalange bone having length and width and on a first lengthwise end defining a first socket; and a second phalange bone having length and width and on a second lengthwise end defining a first ball fit conformally into the first socket, thereby forming a joint, joining the second phalange bone to the first, and permitting rotational movement of the second phalange bone, relative to the first phalange bone.

In a second separate aspect, the present invention may take the form of a robot hand including a set of carpal bones, each of the carpal bones having at least one adjacent bone; and each carpal bone defining at least one socket. For each pair of adjacent carpal bones, at least one connector having a first and second end and wherein the first end and the second end are each in the form of a ball, and wherein the balls are joined by a connective element. Wherein the ball at the first end of the connector is fitted conformally into the socket of a first one of the pair of adjacent carpal bones and the ball at the second end of the connector is fitted conformally into the socket of a second one of the pair of adjacent bones, thereby joining the carpal bones together, but permitting limited relative movement.

In a third separate aspect, the present invention may take the form of a robot digit having a distal end that is free and a proximal end, attached to a further mechanism, and including a distal bone having length and width, and a proximal bone having length and width, the distal and proximal bones being jointed together lengthwise; a membrane sheath about the bones, having an outer membrane and an inner membrane, extending along the bones, the inner membrane layer adjacent to the bones and defining a distal aperture adjacent to the distal bone and a proximal aperture adjacent to the proximal bone; and a first tendon and a second tendon, both extending between the inner membrane and the outer membrane, the first tendon attached to the distal bone through the distal aperture and a second tendon attached to the proximal bone through the proximal aperture.

BRIEF DESCRIPTION OF DRAWINGS

Various embodiments of the invention are disclosed in the following detailed description and accompanying drawings.

DETAILED DESCRIPTION AND EMBODIMENTS

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

To assist the description of the scope and its components the coordinate terms "proximal" and "distal" are used to describe the disclosed embodiments. The terms are used consistently with the description of the exemplary applications and are in reference to robotic anatomy, which is described in analogy to human anatomy, with the "finger" tips being most distal and the "wrist" being the most proximal.

In keeping with the use of analogy to a human hand in the description, in this application, the term "bone" is used to mean a solid element, the solid elements of a robot appendage being roughly analogous to bones in a human appendage. In this instance, the term "solid" encompasses a hard foam and a solid with channels defined in it. The "bones" may be made to mimic the structure of human bones, or may be made to optimize various properties, in a manner which does not structurally mimic human bones. Further, the terms phalange(s) and lumbrical(s), tendon(s) and ligament(s) are used in analogy to these terms in a human hand, it being understood that these terms do not actually refer to human bones and other anatomical elements, but to robotic elements having similar functions. The bones referred to may be made of polymeric material, metal, a compound material, or a combination of materials, that have the structural properties specified.

Figure 1:
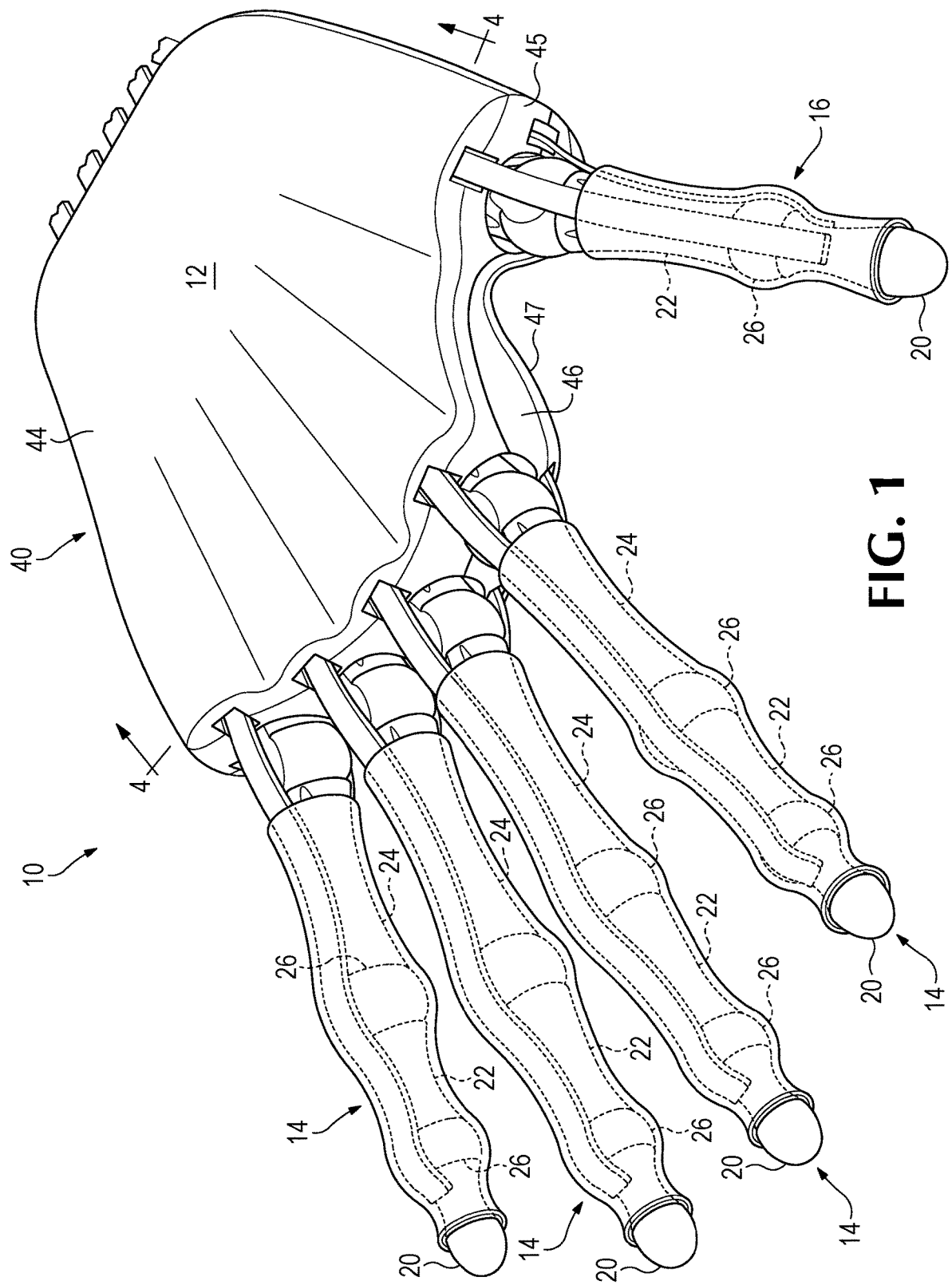
FIG. 1 is an isometric view of a robot hand, according to the present invention.
Figure 2:
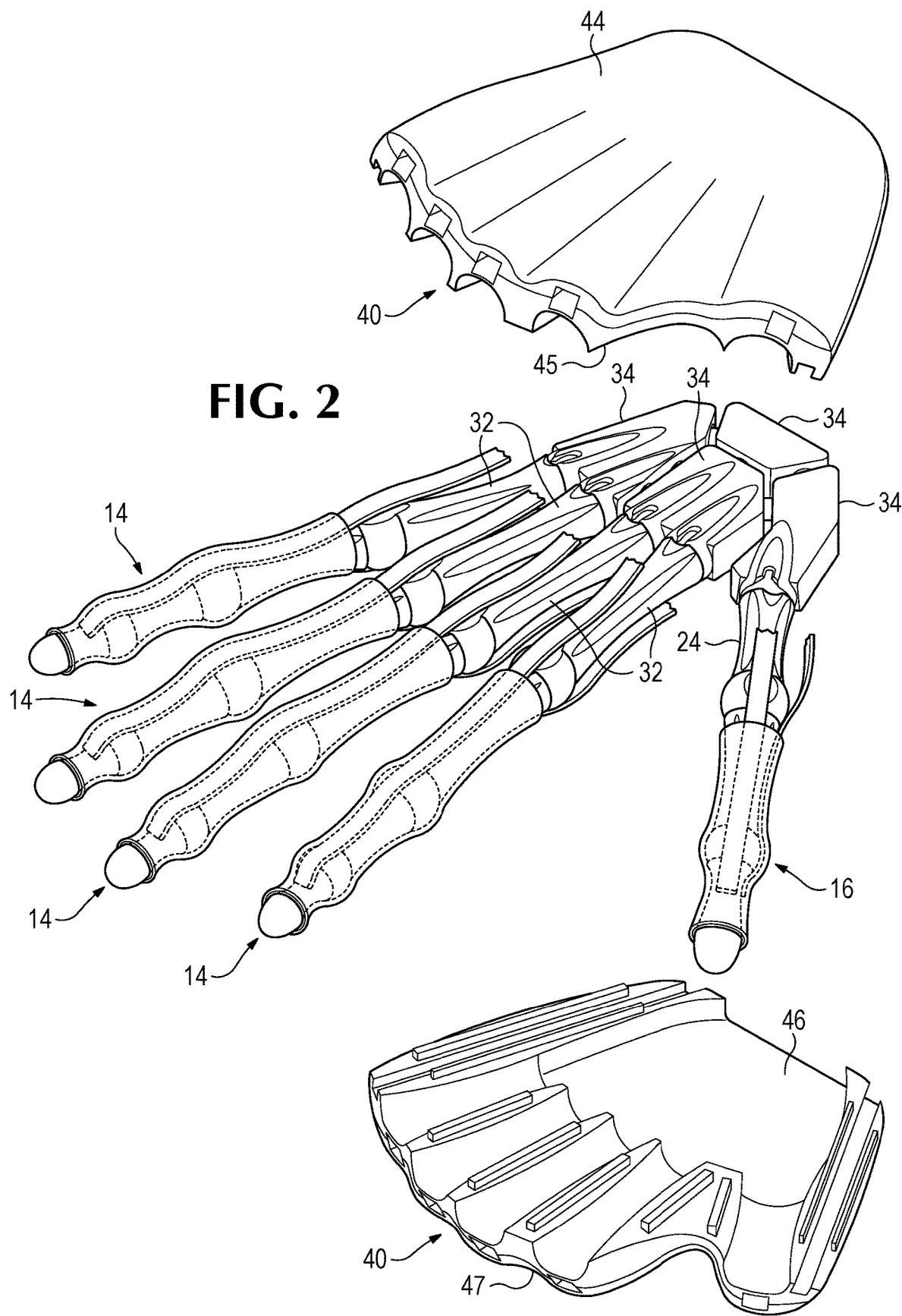
FIG. 2 is an isometric view of the robot hand of FIG. 1, in a state of being partially disassembled.

Referring to FIG. 1, a robot hand 10, includes a palm 12, a set of fingers 14, and a thumb 16. Referring to FIG. 2, each finger 14 includes a distal phalange 20, a middle phalange 22, and a proximal phalange 24, joined together by a set of knuckles 26. Thumb 16 has just a distal phalange 20 and a middle phalange 22. Referring to FIGS. 2-5, the palm 12 is composed of a set of metacarpal bones 32 and carpal bones 34, held together in a snap-together protective covering 40. Carpal bones 34 are further held together by a set of joining elements 42 (FIG. 5), each of which has a ball shape 41 on either end of a short joining member 43. Each ball shape 41 fits into a socket 60 defined in a carpal bone 34. Altogether, elements 42 are each about 1 cm long. In a first embodiment, each socket 60 is formed of material that has some resilient deformability, so that a ball shape 41 can be pressed into a socket 60 with the rim of the socket 60 expanding very slightly to permit the ball shape 41 to enter and then resume its former shape. In an alternative embodiment, ball shape 41 is made of a material with some resilient deformability that can contract as it is pushed into a socket 60, and then expands after it is received in a socket 60. Further, each metacarpal bone 32 is hinged to an adjacent carpal bone 34.

Figure 3:
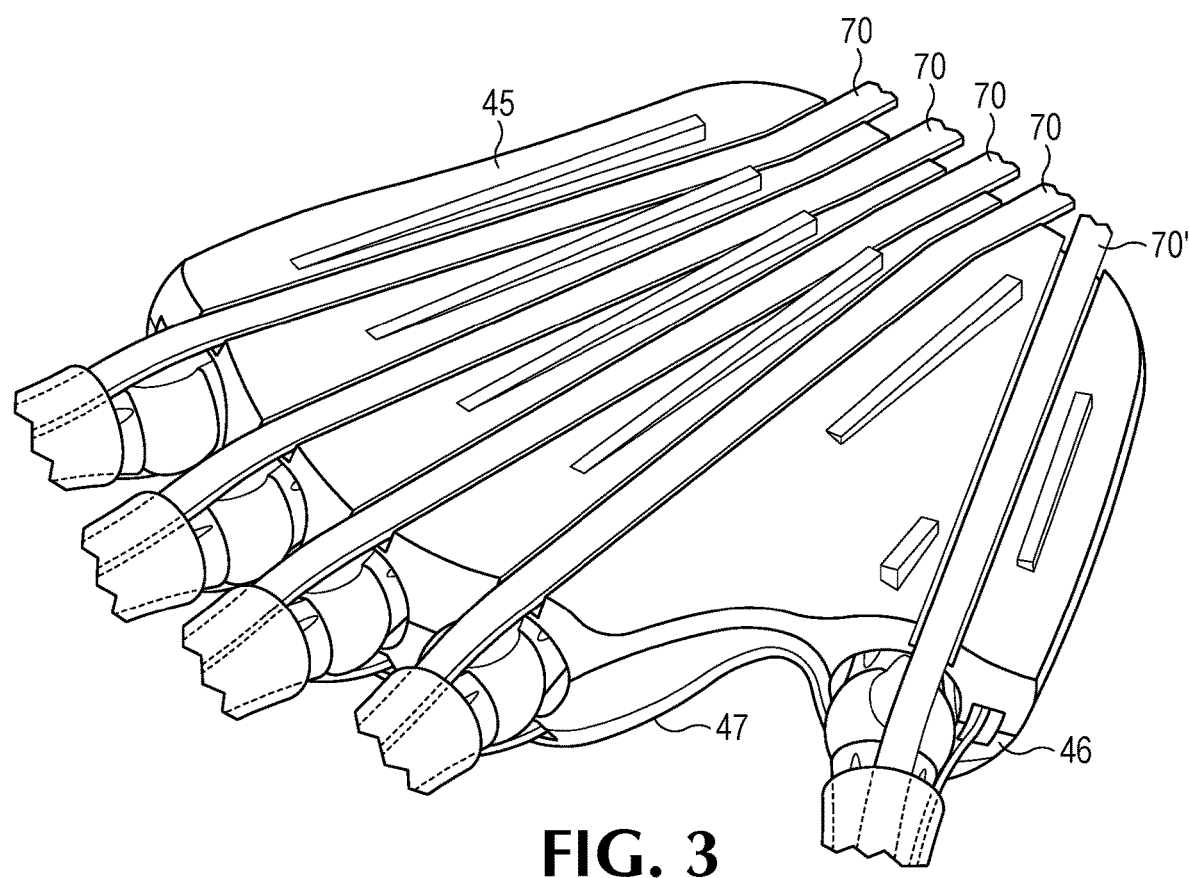
FIG. 3 is an isometric view of a portion of the robot hand of FIG. 1, partially assembled, relative to FIG. 2, and with the top of the palm tendon-guide removed.
Figure 4:
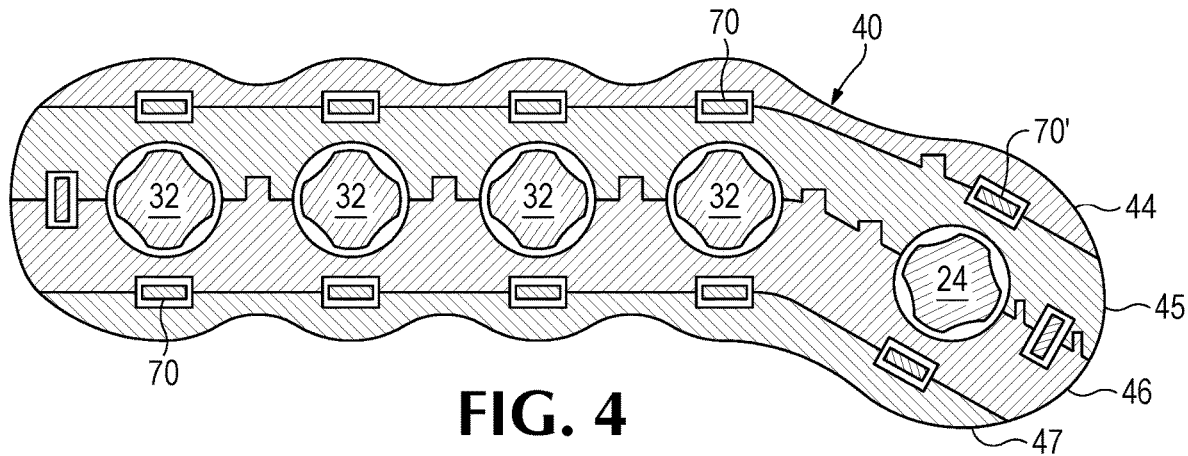
FIG. 4 is a sectional view of the hand of FIG. 1, taken along line 4-4 of FIG. 1.
Figure 5:
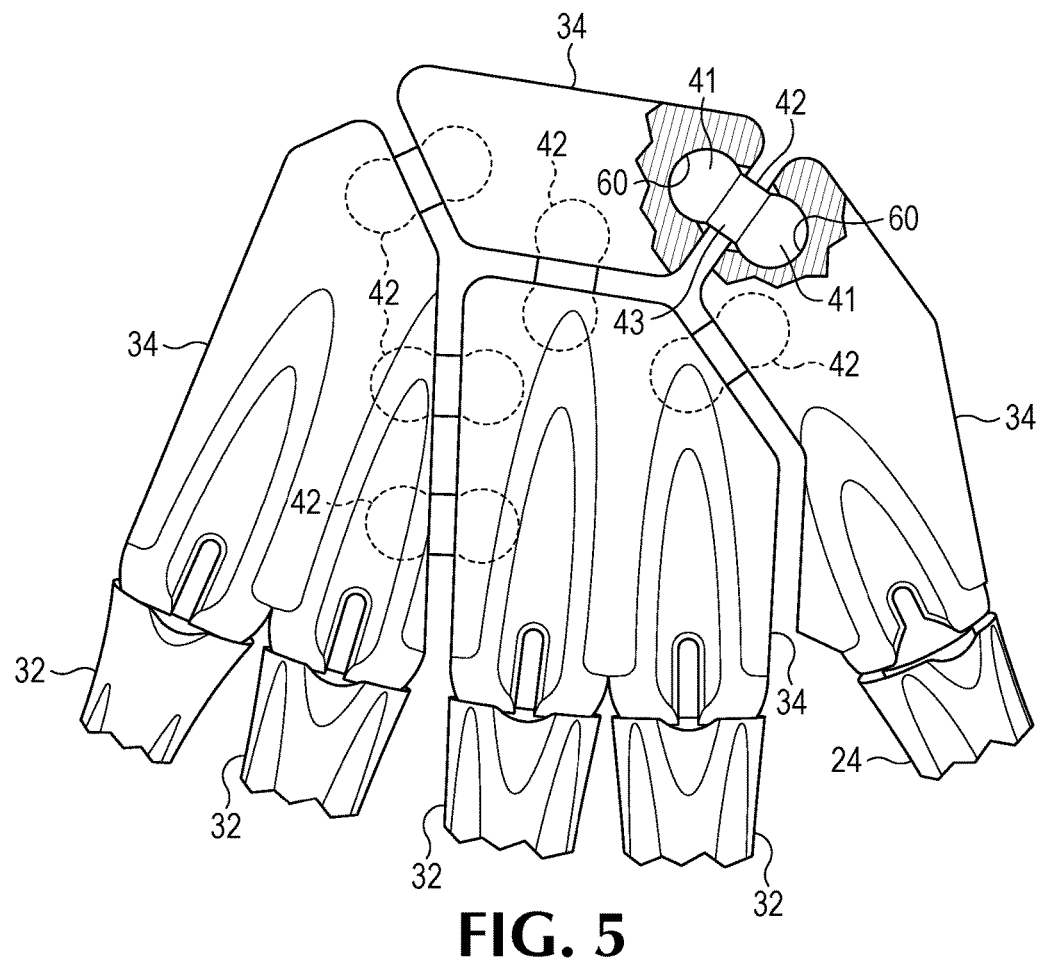
FIG. 5 is a plan view of a portion of the hand FIG. 1, with connective elements shown in dashed line.

Covering 40 includes a top upper portion 44, a bottom upper portion 45, a top lower portion 46 and a bottom lower portion 47. Portions 44 and 45 snap together to form an upper portion, and portions 46 and 47 snap together to form a lower portion. Upper portion (44, 45) and lower portion (46, 47) in turn snap together to form palm protective covering 40. Referring to FIGS. 3 and 4, coverings 40 provide tunnel pathways for tendon sheaths 70, discussed further below.

Figure 10:
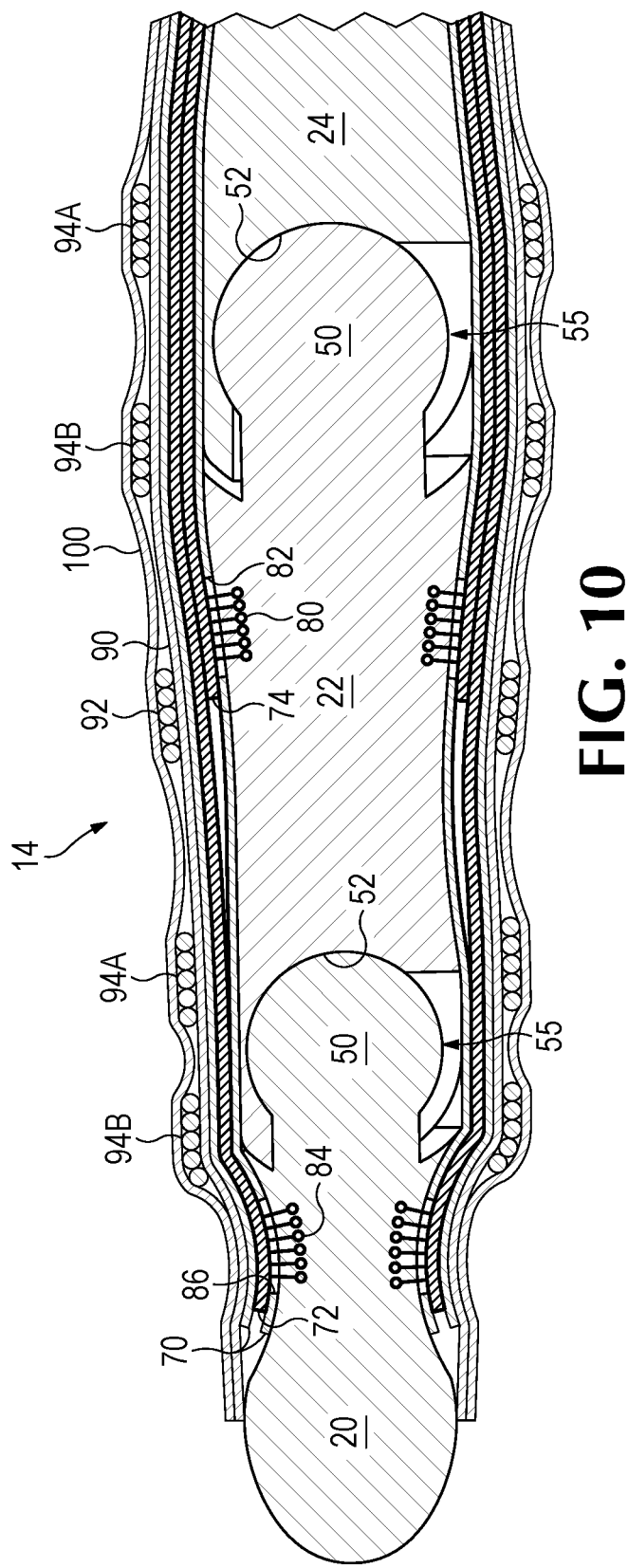
FIG. 10 is a longitudinal sectional view of a distal portion of the finger of FIG. 9.

Referring to FIG. 10, for each finger 14, the distal phalange 20 includes a proximal ball 50, that fits into a distal socket 52, in the middle phalange 22, which also includes a proximal ball 50. This ball 50, in turn, fits into a distal socket 52 in the proximal phalange 24. The area where this ball is sent into the socket is termed a joint 55 and is expanded in width relative to the remainder of the finger 14. In a preferred embodiment, each proximal phalange 24 is joined to a metacarpal 32 by a similar ball and socket joint 55. In one preferred embodiment, each socket 52 is made of a material that is flexible enough to expand slightly to permit the ball 50 to be snapped into place during assembly. In another embodiment, ball 50 is made of resiliently deformable material, and contracts as it is pushed past the rim of the socket 52, as it is pushed into place.

Figure 6:
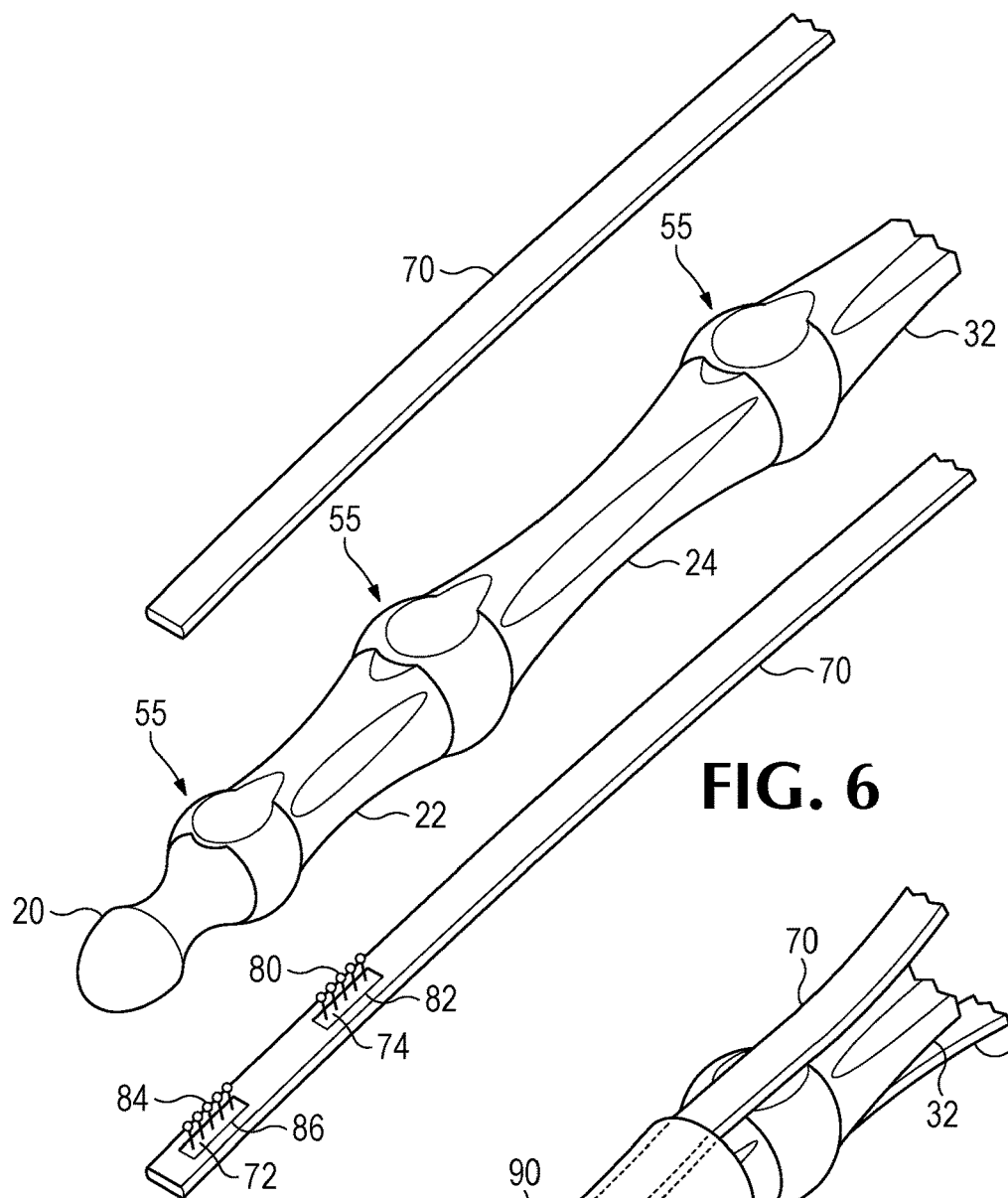
FIG. 6 is an exploded isometric view of the interior of a finger, of the hand of FIG. 1.
Figure 7:
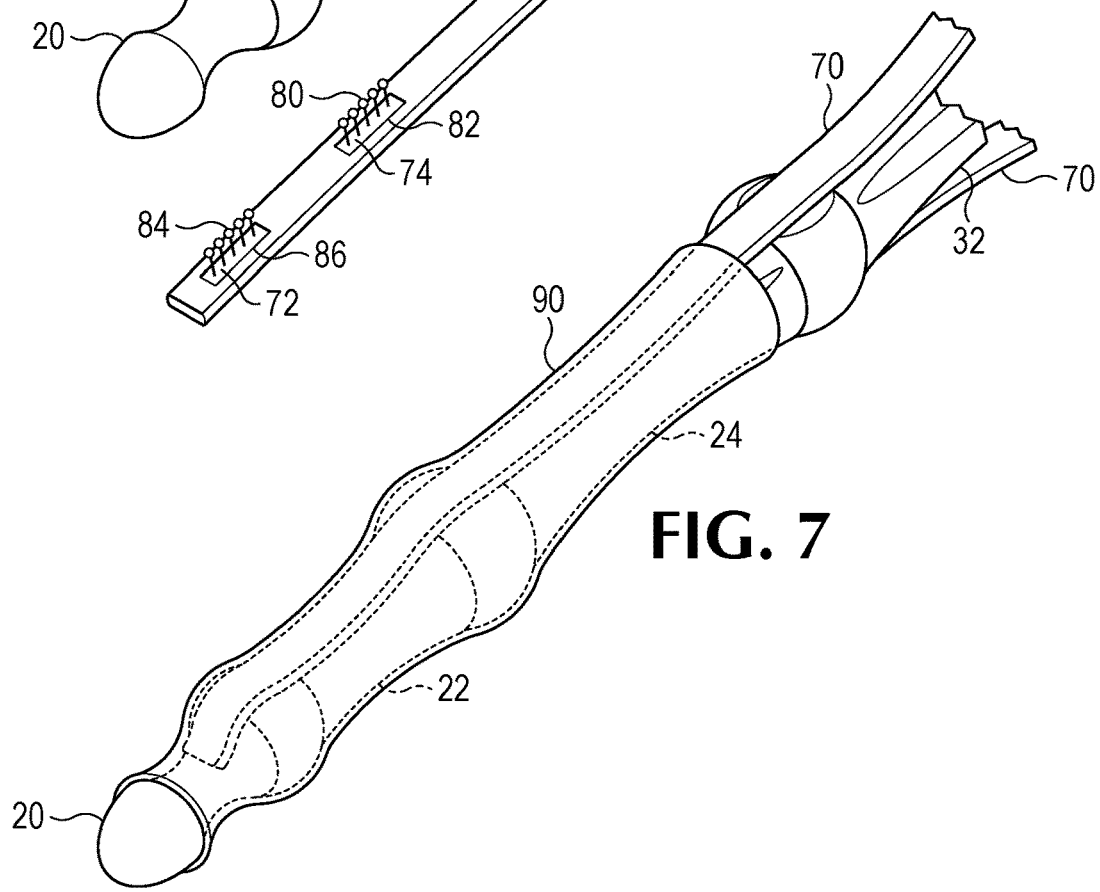
FIG. 7 is a not-exploded isometric view of the finger of FIG. 6, showing an additional layer of wrap.
Figure 8:
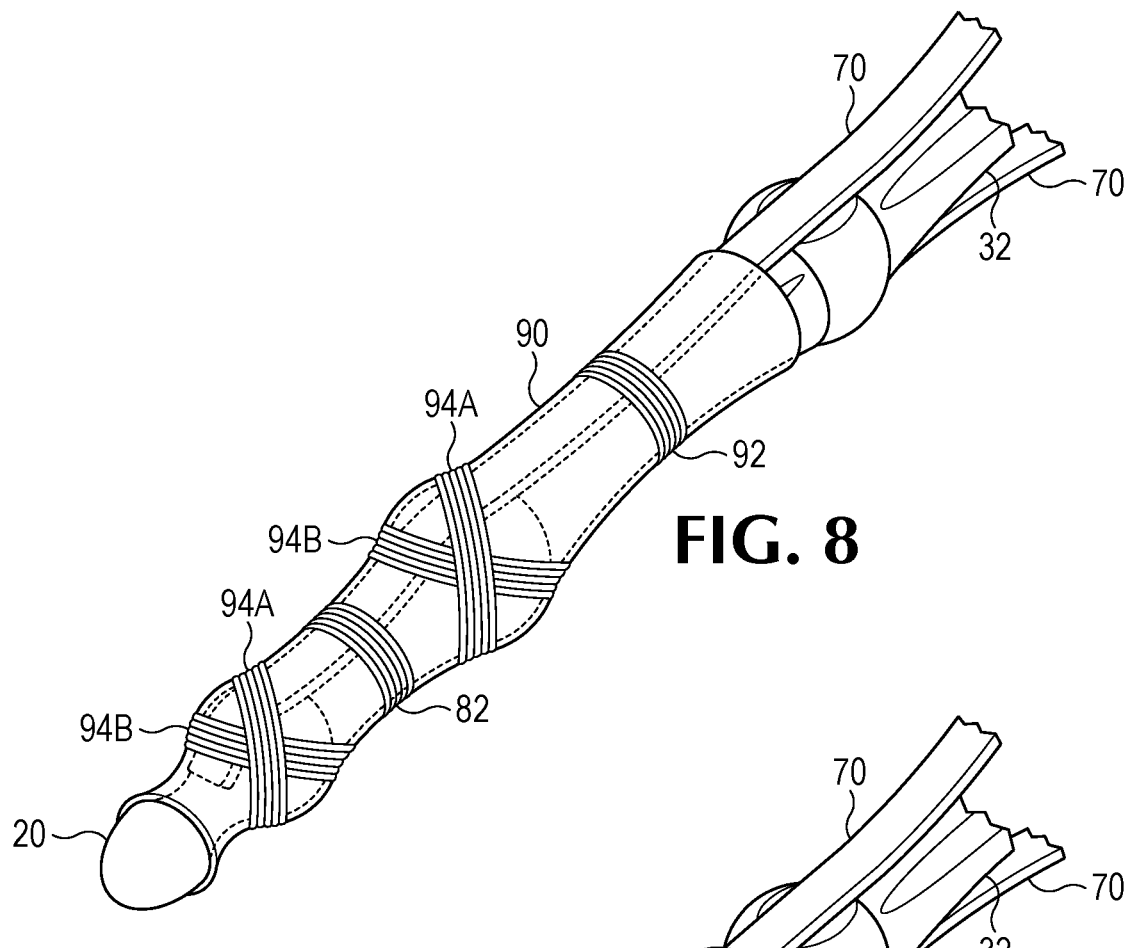
FIG. 8 is an isometric view of the finger of FIG. 7, showing ligaments added, over the wrap of FIG. 7.
Figure 9:
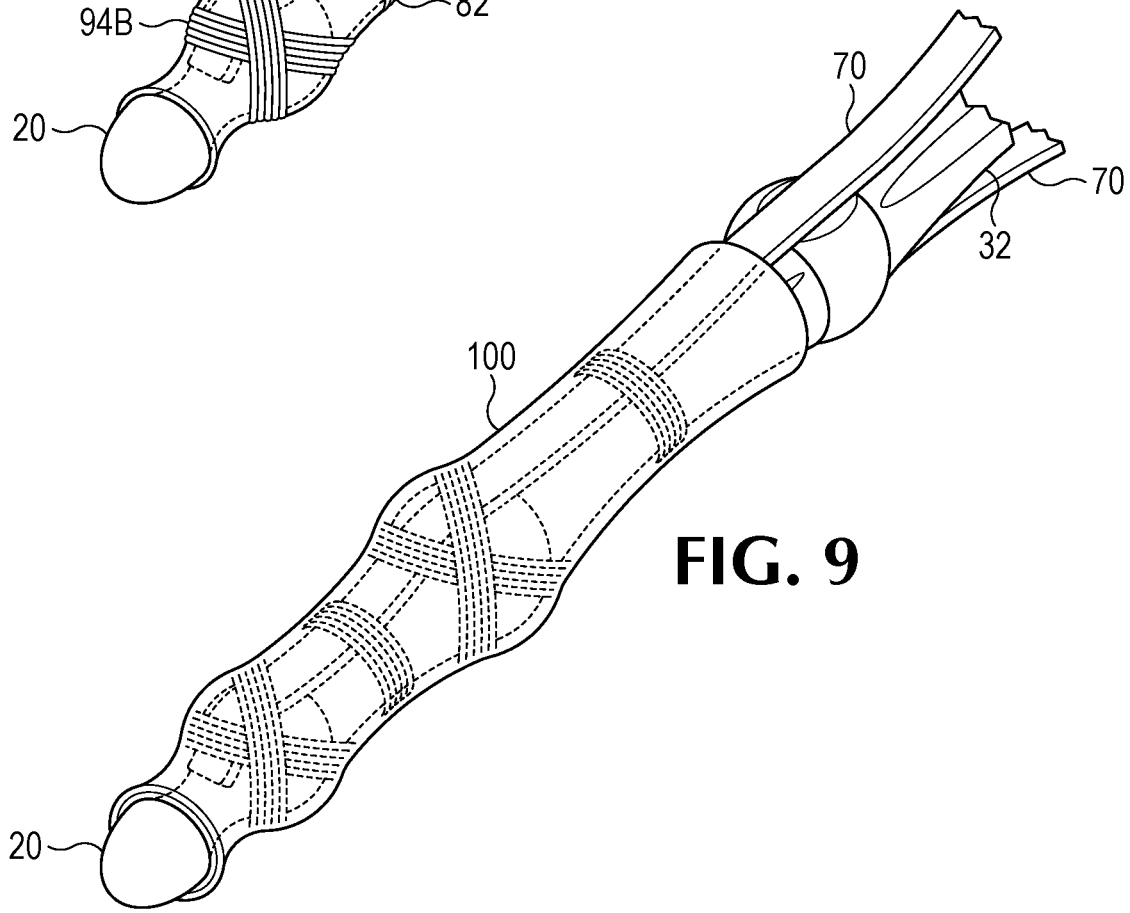
FIG. 9 is an isometric view of the finger of FIG. 8, showing an additional layer of wrap, added over the ligaments of FIG. 7.

As best shown in FIG. 6 and FIG. 10, extending along each finger 14 is a flat sheath 70 made of two tapes joined together at the sides, each holds a distal phalanx tendon 72, and a middle phalanx tendon 74. Also included is a proximal phalanx tendon (not shown). All are in the form of tape, where tape is material that is substantially wider than it is thick. For large robot hands that may exert substantial force, the tape may have a thickness of 0.15" or thicker. Distal phalanx tendon 72 is the most exterior, so that it can reach the distal phalanx 20 without being blocked by the connecting elements 80 that join middle phalanx tendon 74 to the middle phalanx by way of a set of receptive holes (see FIG. 10) in phalanx 20, which is accessed through a middle phalanx opening 82, in sheath 70. In similar manner, after distal phalanx tendon 72 passes over middle phalanx tendon 74, it attaches to the distal phalanx 20, by distal connective elements 84, extending through distal sheath opening 86. As shown in FIGS. 6 and 7, after the tendons 72, 74, and not shown proximal tendon are attached to their respective phalanges, a polymeric membrane 90 is shrink wrapped over the finger 14. Referring to FIG. 8, a set of ring ligaments 92 at the center portions of the middle and proximal phalanges (22, 24) and cruciform ligaments 94 are then applied at the ball and socket joints 55. If a tendon, such as distal phalanx interior tendon 72 is pulled against a force resisting the bending of finger 14, the tendon 72 will strain to break through sheath 70 and wrap 90, to take the most direct path between connective elements 84 and the next juncture at which tendon 74 is constrained. The ring ligaments 92 on distal phalanx 20 constrain tendon 72, as do the ring ligaments 92 on middle phalanx 22. Ring ligaments 92 also serve to maintain connective elements 80 and 84 in place. Cruciform ligaments 94, in addition to providing more constraining force against the tendons 72, 74 and those not shown, also act to prevent the ball joints (50, 52) from bending laterally. For each joint 55, a first cruciform ligament 94A is wrapped about the joint from the proximal-back to the distal-front and a second cruciform ligament 94B is wrapped about the joint from the distal-back to the proximal-front. These two ligaments cross each other on the sides of the joint, thereby constraining lateral movement. After the application of ligaments 92 and 94 a final shrink wrap 100 (FIG. 9) is applied.

The disclosed embodiments are illustrative, not restrictive. While specific configurations of a robot hand have been described, it is understood that the present invention can be applied to a wide variety of robot constructs. There are many alternative ways of implementing the invention.

What is claimed is:

1. A robot hand including a digit having a distal end that is free and a proximal end, attached to a further structural element, and comprising:
   a) a first phalange bone having length and width and on a first lengthwise end defining a first socket;
   b) a second phalange bone having length and width and on a second lengthwise end defining a first ball fit conformally into said first socket, thereby forming a joint, joining said second phalange bone to said first, and permitting rotational movement of said second phalange bone, relative to said first phalange bone; and
   c) wherein said robot hand has a front and a back, and wherein said first socket extends further in said distal direction on said back than on said front, thereby permitting said second phalange to rotate in a forward direction but blocking rotation in a rearward direction.

2. The robot hand of claim 1, wherein said second phalange bone is distal to said first phalange bone.

3. The robot hand of claim 2, wherein:
   a) said digit further includes a third phalange bone, distal to said second phalange bone, and:
   b) wherein said second phalange bone defines a second socket on a first lengthwise end;
   c) said third phalange bone having length and width and on a second lengthwise end defining a second ball fit conformally into said second socket, thereby joining said third phalange bone to said second phalange bone, and permitting rotational movement of said second phalange bone, relative to said first phalange bone.

4. The robot hand of claim 3, wherein said third phalange bone has a distal end and said distal end of said third phalange bone is said distal end of said digit.

5. The robot hand of claim 1, wherein said first phalange bone has a proximal end that is also said proximal end of said digit and said robot hand further includes a set of metacarpal bones and wherein said proximal end of said first phalange bone is hinged to a metacarpal bone.

6. The robot hand of claim 5, further including carpal bones, proximal to said metacarpal bones and wherein each metacarpal bone is hinged to a carpal bone.

7. The robot hand of claim 1, wherein said digit is a first digit, and further including a second digit, and wherein said first digit includes first, second and third phalange bones, whereas said second digit includes only a first phalange bone and a second phalange.

8. The robot hand of claim 7 further including a third, fourth and fifth digit, each including first, second and third phalange bones.

9. A robot hand comprising:
   a) a set of carpal bones, each of said carpal bones having at least one adjacent bone and each carpal bone defining at least one socket;
   b) for each pair of adjacent carpal bones, at least one connector having a first and second end and wherein said first end and said second end are each in the form of a ball, and wherein said balls are joined by a connective element; and
   c) wherein said ball at said first end of said connector is fitted conformally into said socket of a first one of said pair of adjacent carpal bones and said ball at said second end of said connector is fitted conformally into said socket of a second one of said pair of adjacent bones, thereby joining said carpal bones together, but permitting limited relative movement.

10. The robot hand of claim 9, wherein said robot hand has a distal end and a proximal end and wherein each said carpal bone supports a metacarpal bone on its distal end.

11. The robot hand of claim 10, wherein said carpal bones and said metacarpal bones are collectively enclosed in flexible polymeric case.

12. The robot hand of claim 11, having a front side and a back side, and wherein said case is comprised of a front side and a back side, joined together about said bones.

13. The robot hand of claim 9 wherein said connectors are all between 0.5 cm and 2 cm long.

14. The robot hand of claim 9 wherein said sockets are each resiliently deformable in sufficient degree to permit a ball to be pressed into each said socket.

15. The robot hand of claim 9 wherein said each said ball is resiliently deformable in sufficient degree to permit being pressed into a said socket.

16. The robot hand of claim 9 wherein said connective elements are flexible.

17. A robot digit having a distal end that is free and a proximal end, attached to a further mechanism, and comprising:
   a) a distal bone having length and width, and a proximal bone having length and width, said distal and proximal bones being jointed together lengthwise;
   b) a membrane sheath about said bones, having an outer membrane and an inner membrane, extending along said bones, said inner membrane adjacent to said bones and defining a distal aperture adjacent to said distal bone and a proximal aperture adjacent to said proximal bone;
   c) a first tendon and a second tendon, both extending between said inner membrane and said outer membrane, said first tendon attached to said distal bone through said distal aperture and a second tendon attached to said proximal bone through said proximal aperture.

18. The robot digit of claim 17, further including a ring ligament about the center of said proximal bone and placed outside said outer membrane, and wherein a further membrane covers said ring ligament.

19. A robot hand including a digit having a distal end that is free and a proximal end, attached to a further structural element, and comprising:
   a) a first phalange bone having length and width and on a first lengthwise end defining a first socket;
   b) a second phalange bone having length and width and on a second lengthwise end defining a first ball fit conformally into said first socket, thereby forming a joint, joining said second phalange bone to said first, and permitting rotational movement of said second phalange bone, relative to said first phalange bone; and
   c) wherein said robot hand further has a front and a back and further comprises a cruciate ligament complex, having:
      i. a first cruciate ligament, wrapped about said joint from a proximal-back position to a distal-front position;
      ii. a second cruciate ligament, wrapped about said joint from a proximal-front position to a distal-back position; and
      iii. whereby said first and second cruciate ligaments mutually cross on either side of said joint, thereby constraining lateral movement but permitting backward and forward movement.

20. The robot hand of claim 19, wherein said first and second cruciate ligaments each comprise multiple strands.

* * * * *